(12) United States Patent
Pasini et al.

(10) Patent No.: US 12,454,379 B2
(45) Date of Patent: Oct. 28, 2025

(54) MACHINE FOR GROUPING TOGETHER FILTER BAGS FOR INFUSION PRODUCTS

(71) Applicant: I.M.A. INDUSTRIA MACCHINE AUTOMATICHE S.p.A., Ozzano Dell'Emilia (IT)

(72) Inventors: Fabio Pasini, Ozzano Dell'Emilia (IT); Sauro Rivola, Ozzano Dell'Emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 0 days.

(21) Appl. No.: 18/711,476

(22) PCT Filed: Dec. 19, 2022

(86) PCT No.: PCT/IB2022/062456
§ 371 (c)(1),
(2) Date: May 17, 2024

(87) PCT Pub. No.: WO2023/119112
PCT Pub. Date: Jun. 29, 2023

(65) Prior Publication Data
US 2025/0002197 A1  Jan. 2, 2025

(30) Foreign Application Priority Data

Dec. 21, 2021  (IT) .......................... 102021000031892

(51) Int. Cl.
*B65B 29/02*   (2006.01)
*B65B 35/16*   (2006.01)
(Continued)

(52) U.S. Cl.
CPC .............. *B65B 57/14* (2013.01); *B65B 29/02* (2013.01); *B65B 29/028* (2017.08); *B65B 35/16* (2013.01);
(Continued)

(58) Field of Classification Search
CPC ....... B65B 29/02; B65B 29/028; B65B 35/16; B65B 35/26; B65B 43/50; B65B 57/14; B65G 47/847
(Continued)

(56) References Cited

U.S. PATENT DOCUMENTS 3,517,477 A * 6/1970 Thornton ................. B65B 19/32
53/53
4,510,730 A * 4/1985 Edmondson ............ G01M 3/36
53/53
(Continued)

FOREIGN PATENT DOCUMENTS

EP  1506117 A2  2/2005
EP  2052976 A1  4/2009
(Continued)

OTHER PUBLICATIONS

International Search Report dated Apr. 26, 2023 from counterpart PCT App No. PCT/IB2022/062456.

*Primary Examiner* — Stephen F. Gerrity
(74) *Attorney, Agent, or Firm* — SHUTTLEWORTH & INGERSOLL, PLC; Timothy J. Klima

(57) ABSTRACT

A machine for grouping filter bags for infusion products includes: a movement wheel rotating about a first axis; a rotary transfer wheel, rotating in a synchronised fashion with the movement wheel, about a second axis; a device for collecting the bags; a plurality of gripping elements positioned along a circumference of the transfer wheel and movable with it for picking up, in a first angular position, a bag from the movement wheel and a release configuration of the bag in the collecting device, in a second angular position and after an angular stretch of rotation. A sensor detects possible defects of the bags, and identifies the defective bags before they reach the second angular position. A rejection area receives the defective bags. A locking control controls (Continued)

the gripping element to prevent release of the bag in the second angular position, when detected to be defective by the sensor.

19 Claims, 6 Drawing Sheets

(51) Int. Cl.
  *B65B 35/26* (2006.01)
  *B65B 43/50* (2006.01)
  *B65B 57/14* (2006.01)
  *B65G 47/86* (2006.01)
(52) U.S. Cl.
  CPC .............. *B65B 35/26* (2013.01); *B65B 43/50* (2013.01); *B65G 47/847* (2013.01)
(58) Field of Classification Search
  USPC ................................ 53/443, 53, 54, 531, 542
  See application file for complete search history.

(56) References Cited

U.S. PATENT DOCUMENTS

| | | | |
|---|---|---|---|
| 6,571,537 | B2 | 6/2003 | Ghirlandi |
| 2009/0241468 | A1* | 10/2009 | Bernardi et al. ...... B65B 29/028 53/542 |
| 2010/0059332 | A1* | 3/2010 | Cuypers et al. ........ B65B 35/26 198/470.1 |
| 2018/0305051 | A1* | 10/2018 | Van Den Brink ... B65G 47/847 |
| 2022/0289413 | A1* | 9/2022 | Conti .................... B65B 29/028 |

FOREIGN PATENT DOCUMENTS

| | | |
|---|---|---|
| WO | 03097459 A2 | 11/2003 |
| WO | 2017145044 A1 | 8/2017 |
| WO | 2019087012 A1 | 5/2019 |

* cited by examiner

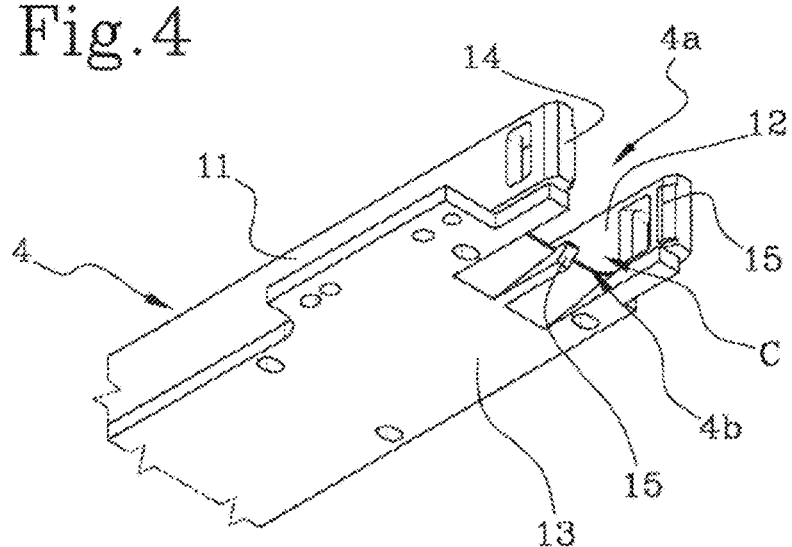
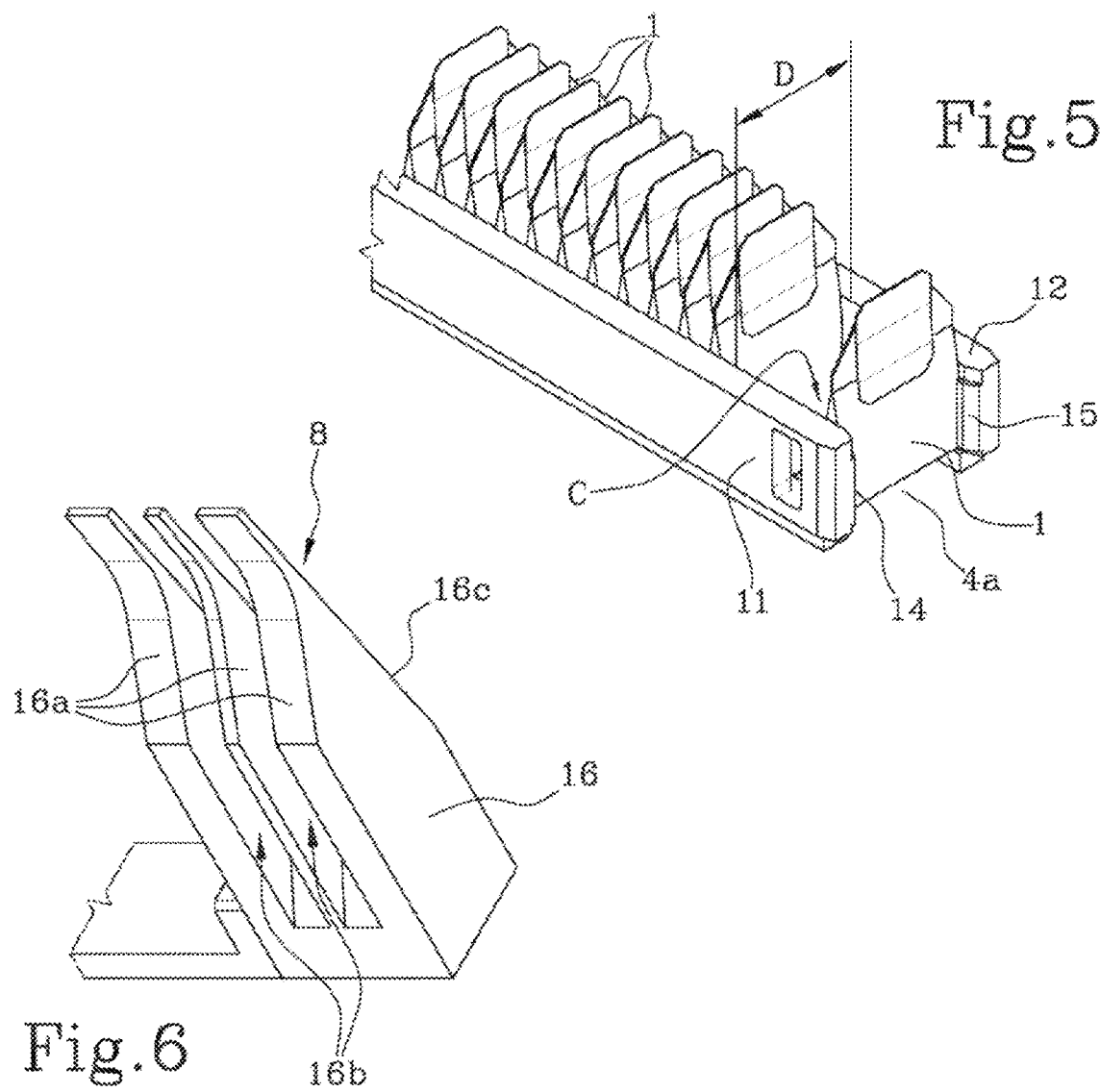

MACHINE FOR GROUPING TOGETHER FILTER BAGS FOR INFUSION PRODUCTS

This application is the National Phase of International Application PCT/IB2022/062456 filed Dec. 19, 2022 which designated the U.S.

This application claims priority to Italian Patent Application No. 102021000031892 filed Dec. 21, 2021, which application is incorporated by reference herein.

TECHNICAL FIELD

This invention relates to a machine for grouping together filter bags for infusion products, such as tea, coffee, camomile (in powder, granular or leaf form).

BACKGROUND ART

The term filter bags is used to indicate at least two types of filter bag: the single-chamber filter bags, comprising, in a minimum configuration, a piece of filter material forming a chamber containing a dose of infusion product; and the double-chamber filter bags, again comprising a single piece of filter paper, but forming two separate chambers. Each chamber contains a dose of infusion product. The two chambers are folded towards each other forming a single upper end (in the shape of an upturned "V") and a bottom end in the shape of a "W".

The single-chamber and double-chamber filter bags can also be equipped with a tag and a tie string connecting the tag to the filter bag.

Lastly, an overwrap envelope may be added to the above mentioned filter bags for wrapping and closing the single filter bag, in a hermetic or non-hermetic manner.

A machine for making filter bags for infusion products of this kind is known from patent document WO2017/145044.

This machine is movable continuously and thanks to this there is a productivity greater than the productivity of stepwise machines, maintaining a high quality of the filter bag.

This solution of the machine comprises at least a carousel rotating continuously and having, on its circumferential surface a plurality of first gripping elements for holding a respective piece of filter material being formed and a plurality of stations associated with a corresponding first gripping unit and configured to operate on the piece of filter material in order to form, partly or completely, a filter bag along at least one predetermined angular stretch of rotation of the movement carousel. Therefore, the basic concept of the machine is that it comprises a multiplicity of operating units, all operating a same operation on the piece of filter material, all independent of each other and driven continuously about an axis of rotation.

Upon completion of the operations on the piece of filter material, each operating station and the corresponding gripping unit arrive at an outfeed area of the movement carousel and release the piece in such a way that it can be transferred to a subsequent processing step/station, for example a further movement carousel.

As mentioned above, depending on the type of filter bag being formed, a single carousel defining the machine or more than one carousel in succession with each other and having a structure similar to that described above and defining the machine in its entirety, result in the definitive formation of the filter bag. The latter, therefore, must be transferred to a collecting or stacking area or, if it is defective, released into a collecting area, which is different from the previous one, for the defective products.

For this reason, it is necessary to provide an operating unit which is able to operate at the same high speed of the carousel(s) present in the machine for picking up the filter bags from them and, simultaneously, is be able to both discharge any defective filter bags or release the filter bags in a collecting or stacking area.

A solution of an operating unit for releasing filter bags is known from patent document WO2019/087012 which illustrates a transfer wheel, rotating with continuous motion provided with a plurality of gripping devices positioned along the transfer wheel and configured to each receive a filter bag from a corresponding operating station and for releasing the filter bag in an area for collecting the filter bags. Each gripping device is movable between a first operating position for receiving the filter bag from a previous carousel or for releasing the filter bag in the collecting area, and a second operating position for retaining the filter bag.

There is also a control unit configured for measuring any defect in the filter bags formed on the previous carousel and an auxiliary control device positioned on the transfer wheel and connected to the control unit.

The auxiliary device allows the gripping unit selected and on a signal of the control unit to release the defective filter bag in an unloading area positioned before the collecting area with reference to the direction of rotation of the wheel.

It has been noted that the position of the unloading area of the defective filter bags relative to the collecting area is along an angled stretch of reduced rotation and this, at high production speeds of the machine, may create response delays of the auxiliary device such as to carry the defective bag beyond the unloading area or even in the collecting area.

AIM OF THE INVENTION

The aim of the invention is therefore to provide a machine for grouping together filter bags for infusion products with continuous movement which is able to complete in a fast and precise fashion a cycle for forming the filter bag with a safe storage of the filter bag.

More specifically, the aim of the invention to provide a machine for grouping together filter bags for infusion products which is able to select and reject unsuitable filter bags with a high level of safety, maintaining a reduced size and high flexibility at high operating speeds of the machine.

Said aims are fully achieved by a machine for forming filter bags for infusion products according to the appended claims.

BRIEF DESCRIPTION OF THE DRAWINGS

The invention will be described with reference to the accompanying drawings, provided by way of example only and without limiting the scope of the invention, in which:

FIG. 4 is a perspective view from below of a device for collecting filter bags of the previous drawings;

FIG. 5 is a partial perspective view from above of the collecting device of FIG. 4;

FIG. 6 is a perspective view of an extraction body forming part of a rejection area of the machine of FIGS. 1 to 3;

DETAILED DESCRIPTION OF PREFERRED EMBODIMENTS OF THE INVENTION

Figure 1:
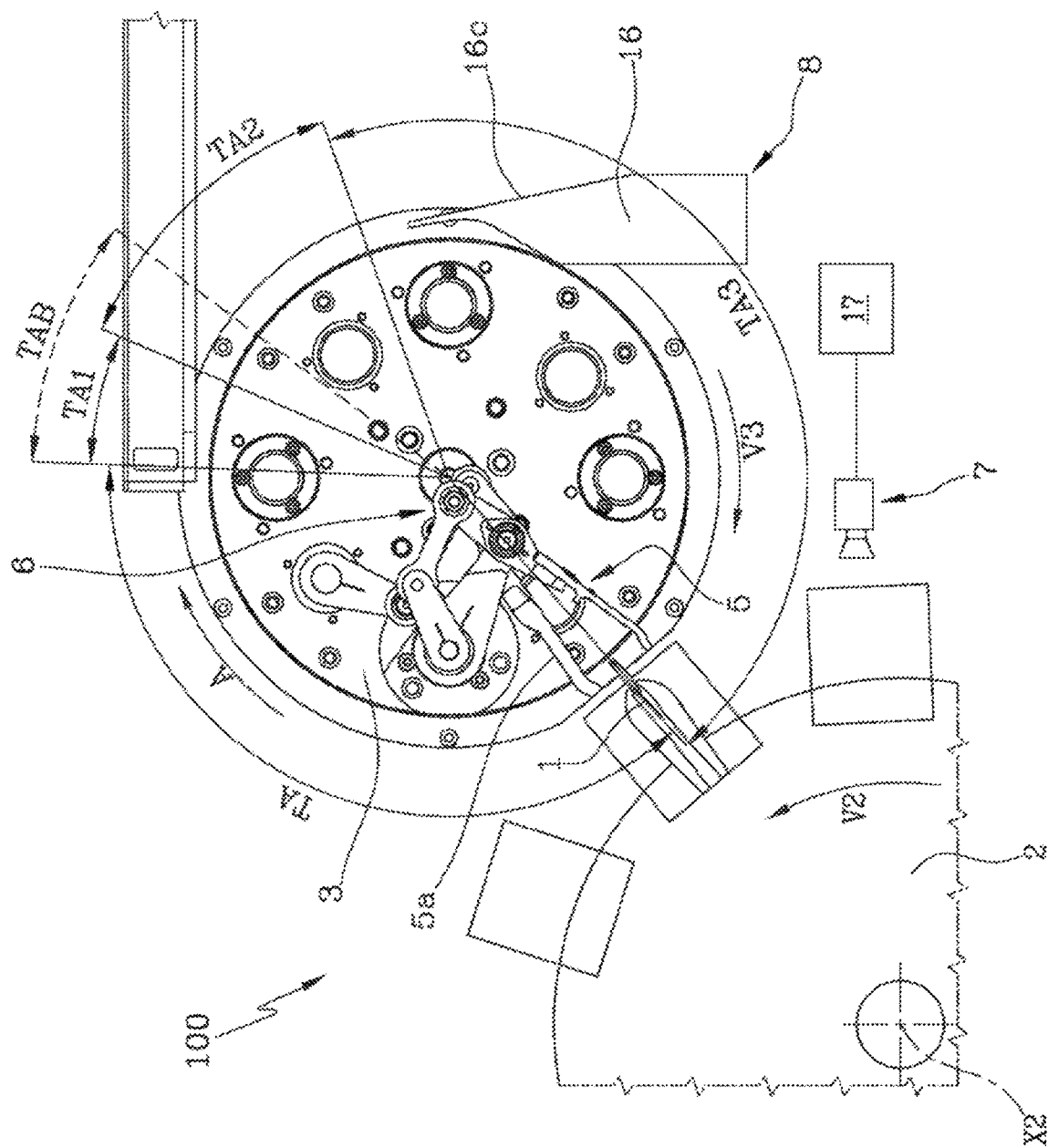
FIGS. 1 to 3 illustrate a schematic front view of a transfer wheel forming part of the machine for grouping together filter bags for infusion products, according to the invention, in corresponding three different operating configurations.
Figure 2:
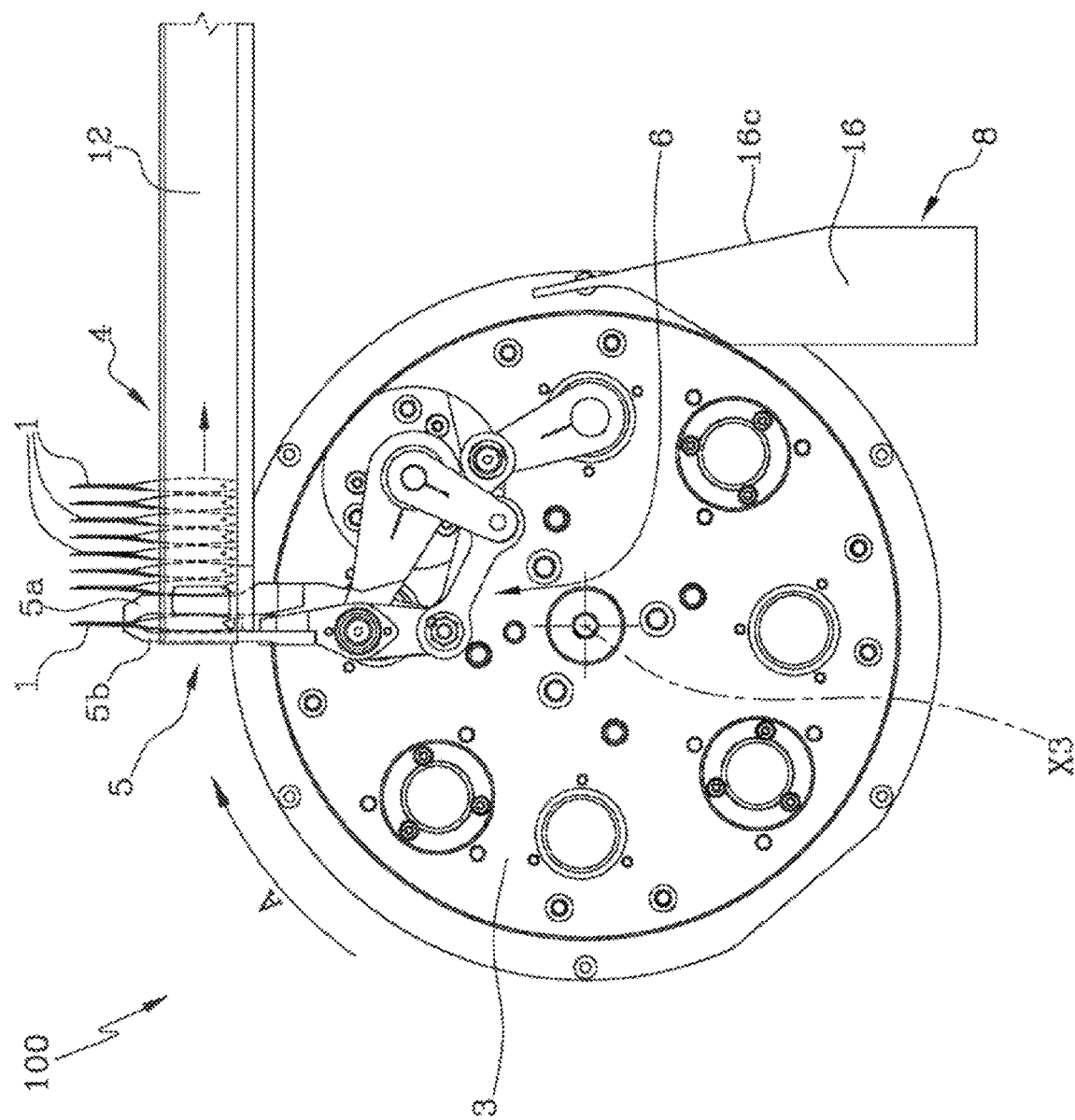
Figure 3:
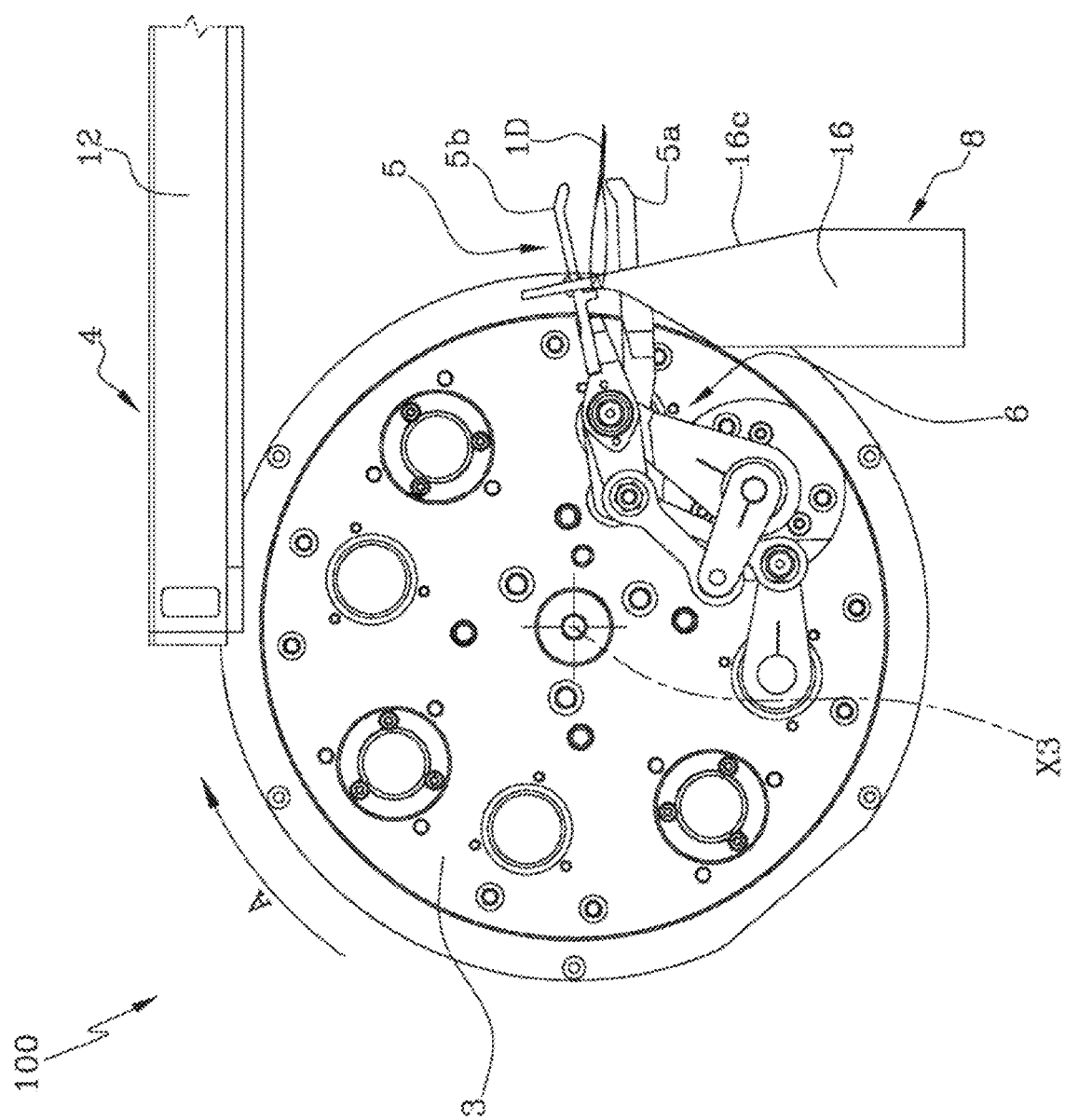

With reference to the accompanying drawings, and with particular reference to FIGS. 1 to 3, the machine according to the invention, labelled 100 in its entirety, is used for making and grouping together filter bags 1 containing infusion products, such as tea, coffee, camomile dosed in powder, granular or leaf form.

The expression "filter bags" can be used to indicate at least two types of filter bag.

A first type, known as single-chamber, comprises a piece of filter material forming a single chamber containing a dose of infusion product.

A second type of filter bag, known as double-chamber, comprises a single piece of filter material, which forms two separate chambers. Each chamber contains a dose of infusion product. The two chambers are folded towards each other forming a single upper end (in the shape of an upturned "V") and a bottom end in the shape of a "W".

These two types of filter bag may be equipped with a gripping tag and a tie string connecting the tag to the filter bag 1 formed.

An outer over-wrapping envelope may also be added to wrap around and enclose each single filter bag 1 formed.

The machine 100, according to the invention, starts from the concept of being able to obtain various types of filter bag, including those mentioned above (from the simpler single-chamber filter bag to the more complex double-chamber bag with tie string and tag in overwrap envelope) adding, when necessary, operating stations designed to perform the requested operation on the piece of filter material or on the filter bag (folding and/or applying tie string and tag, and/or applying outer overwrapping envelope, etc), whilst maintaining a continuous operation of the machine.

The machine 100 for forming and grouping together filter bags 1 for infusion products (starting from pieces of filter material each having at least one dose of infusion product) comprises a movement wheel 2 which can be operated (preferably with continuous motion) in rotation about a first axis X2 of rotation.

The machine 100 also comprises a transfer wheel 3 which can be operated, in a synchronised fashion with the movement wheel 2, (preferably with continuous motion) in rotation about a second axis X3 of rotation, parallel to the first axis X2 of rotation.

In the configuration illustrated, the movement wheel 2 is located lower than the transfer wheel 3. The machine 100 also comprises a device 4 for collecting filter bags 1 (in this case formed filter bags) configured for receiving the filter bags 1 and positioned close to the transfer wheel 3.

The machine also comprises a plurality of gripping elements 5 (only one is illustrated here by way of example) positioned along the circumference of the transfer wheel 3 and movable with it.

Each gripping element 5 is configured for picking up, in a first angular position, a filter bag 1 from the movement wheel 2 and a configuration for releasing the filter bag 1 in the collecting device 4, in a second angular position and after an angular stretch TA of rotation has been travelled along a feed direction A.

Moreover, the machine 100 comprises sensor means 7 (in this case positioned upstream of the device 4 for collecting the filter bags 1 formed, relative to the feed direction A), and configured for detecting a possible defect of the filter bags 1 in such a way as to identify defective filter bags 1D before they reach the above-mentioned second angular position where the collecting device 4 is located (FIG. 1).

The machine 100 also comprises a rejection area 8 configured for receiving the defective filter bags 1D.

In light of this, the rejection area 8 is located in a position lower than the collecting device 4.

As illustrated, the rejection area 8 is located downstream of the collecting device 4 and upstream of the first angular position, relative to the feed direction A.

Again as illustrated, the machine 100 comprises locking control means 9 configured to control the gripping element 5 in such a way as to prevent the release of the filter bag 1D in the second angular position, that is, in the collecting device 4, when the gripping filter bag 1D has been detected to be defective by the sensor means 7.

More specifically, the locking control means 9 are configured to control the gripping element 5, which is gripping the defective filter bag 1D, to release it only after passing the second angular position along the feed direction A, so that defective filter bags 1D are released into the rejection area 8 downstream of the collecting device 4.

Again as illustrated, the collecting device 4 is provided with a bottom opening 4b located close to the transfer wheel 3 and sized to be passed through by the gripping elements 5 when they pass along said second angular position.

In other words, the machine comprises a transfer wheel which is able to move the filter bags, in a rapid, fast and precise manner, into storage areas and, simultaneously, selectively perform a rejection of the filter bags considered defective without reducing the operating speed of the machine.

The structure of the wheel, as described in detail below, allows the gripping units to always pass beyond the collecting device even in the presence of a defective bag, which will be unloaded in the rejection area after the passage of the collecting device.

In short, the basic concept of the machine 100 is that it comprises one or a multiplicity of wheels, each having operating units all operating a same operation on the piece of filter material, all independent of each other and driven continuously about an axis of rotation.

This configuration allows an intermediate operation or the completion of the filter bag to be obtained on a large number of pieces of filter material per unit of time and in a reduced space (angular section).

The invention schematically describes two wheels 2 and 3, forming part of the machine 100, which could be the last operating wheels along the feed line A of the machine 100 combined with a single carousel for forming the filter bags or combined with a series of carousels rotating continuously connected to each other to complete the filter bag 1.

Again as illustrated, the collecting device 4 comprises two opposite vertical walls 11 and 12 located at a distance D such as to touch opposite sides of a filter bag 1 and a base 13 configured to support from beneath a bottom of a filter bag.

In light of this, the base 13 is equipped with the bottom opening 4b.

It should be noted that the base 13 of the collecting device 4 is positioned horizontally and substantially perpendicular to a spoke of the transfer wheel 3.

It should be noted that each gripping element comprises a gripper 5 consisting of two claws 5a and 5b for retaining the filter bag 1 and articulated on the transfer wheel 3; each gripper 5 is connected to gripper control means 6 configured to rotate the two claws 5a, 5b between a gripping or release position wherein the two claws 5a, 5b are mutually spaced apart (FIGS. 1 and 3), and a position for retaining the filter bag 1, wherein the two claws 5a, 5b are close together with interposed the filter bag 1, for retaining the filter bag 1 over time at least along the angular stretch TA of rotation between the first and second angular positions (FIG. 2).

It should be noted that the gripping element 5 is also configured and can be operated in such a way that when it releases the filter bag 1 in the collecting device 4, the gripping element 5 pushes a further filter bag already positioned in the collecting device 4 along an accumulation direction (indicated with an arrow in FIG. 2) to make space for the filter bag released each time.

In light of this, one of the two claws 5a and 5b is configured for pushing the further filter bag located in the collecting device 4 along the accumulation direction.

In light of this, the angular stretch TA of rotation along the feed direction A by each gripping element 5 between the first angular position and the second angular position is less than 180°.

Preferably, the transfer wheel 3 has a direction of rotation V3 opposite to the direction of rotation V2 of the movement wheel 2.

It should be noted that the sensor means 7 comprise at least one sensor (video camera) configured to detect a defect in the filter bag picked up by a gripping element 5 and a processing unit 17 connected to the sensor for receiving from the latter a signal that a defective filter bag 1D has been picked up by the gripping element 5, and to the locking control means 9 to send them a locking activation signal, so as to prevent the gripping element 5 from releasing the defective filter bag 1D in the second angular position.

In the accompanying drawings, the sensor is shown at the movement wheel 2 only by way of an example, and it may be positioned in previous operating wheels or carousel forming part of the machine.

Figure 7:
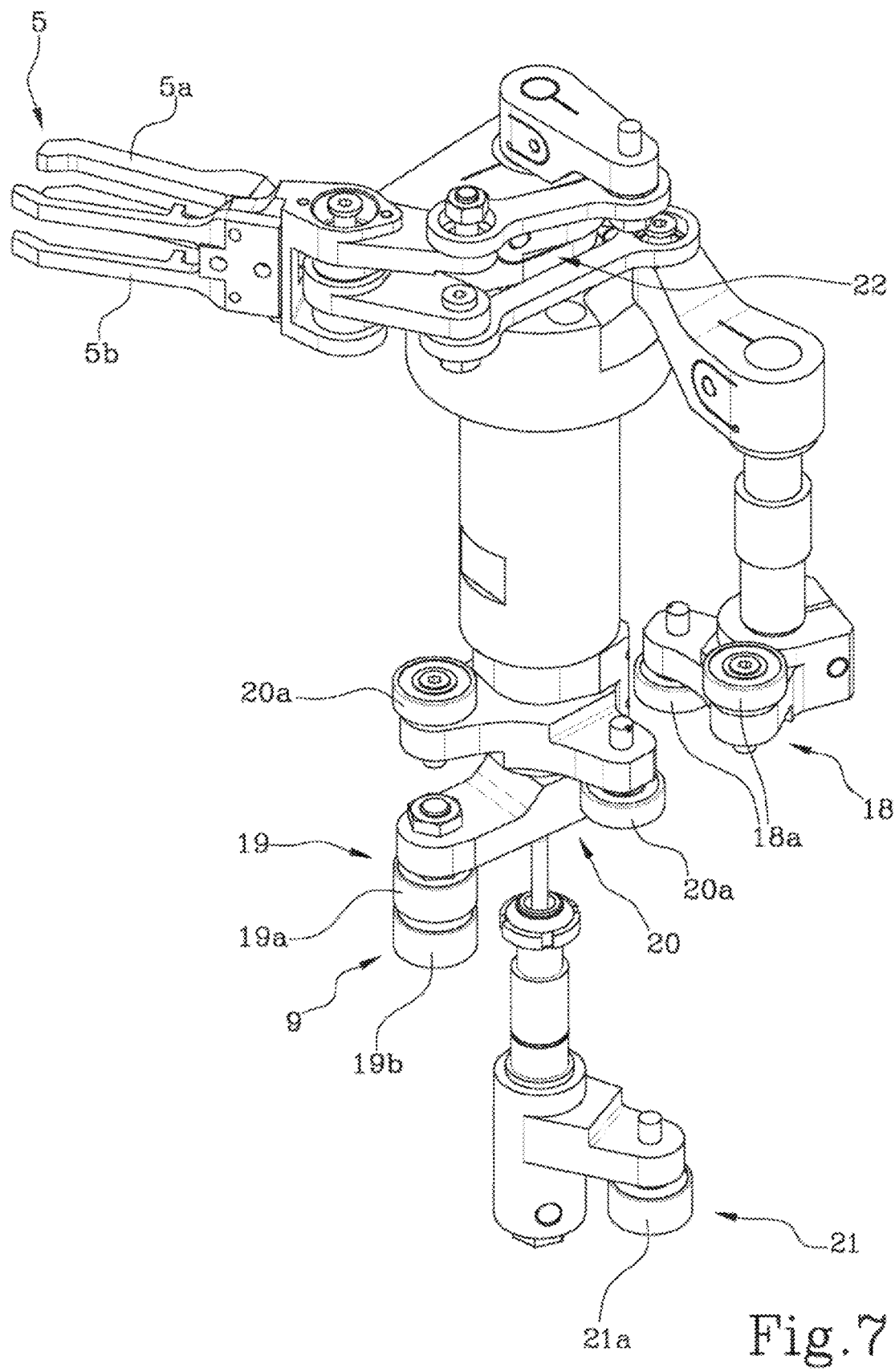
FIG. 7 is a perspective view, with some parts cut away to better illustrate others, of a detail of a gripping element forming part of the transfer wheel of FIGS. 1 to 3.
Figure 8:
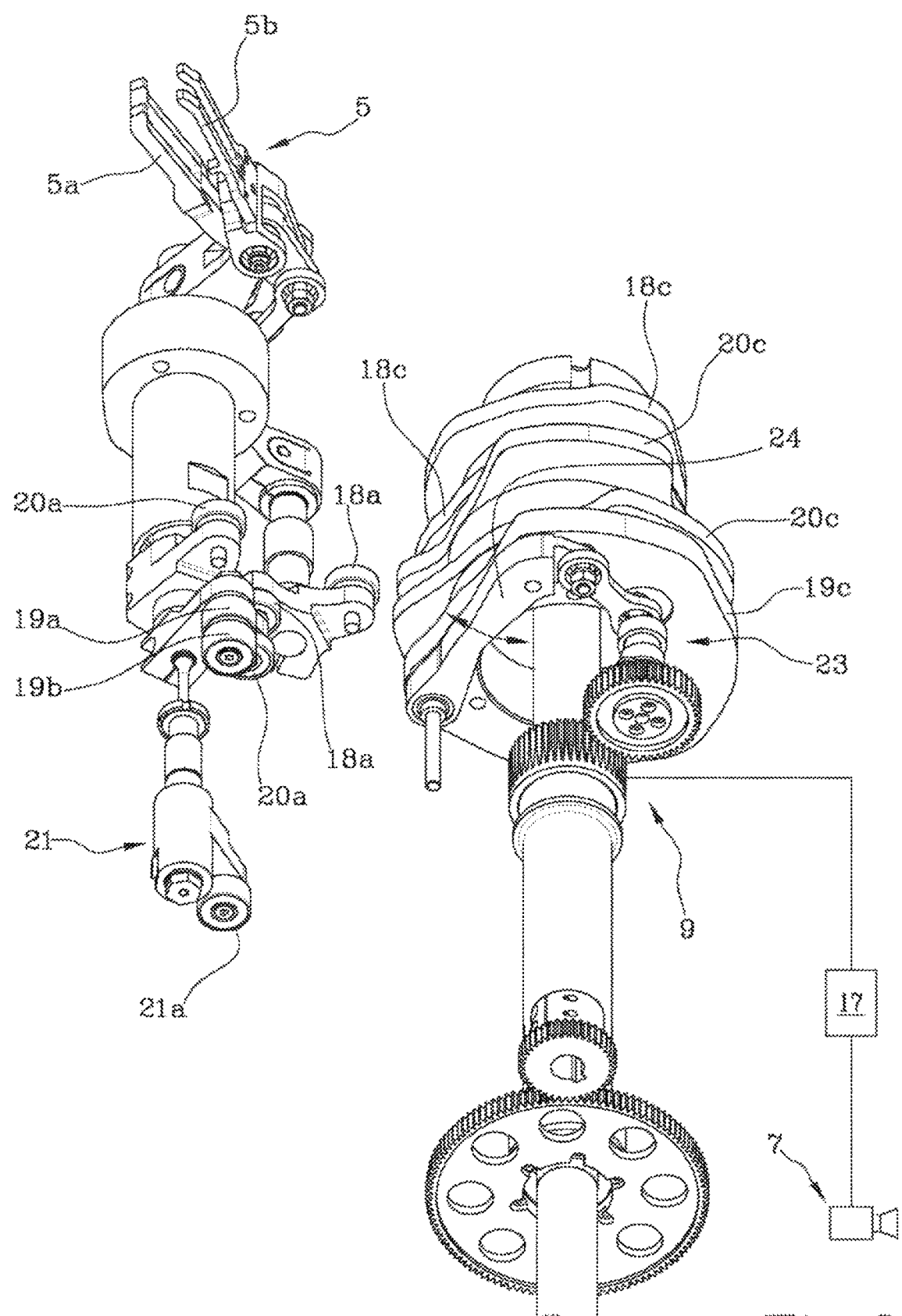
FIG. 8 is a perspective view, with some parts cut away to better illustrate others, of the gripping device of the transfer wheel of the previous drawings connected to first and second control means.

FIGS. 7 and 8 show a single gripping element 5 and the gripper control means 6 and the locking control means 9.

The gripper control means 6 comprise:
a first kinematic unit 18 comprising at least two cam follower rollers 18a configured for the movement (rotation) of one of the two claws 5a of the gripper 5 and movable along corresponding tracks 18c with cam profiles (visible in FIG. 8);
a second kinematic unit 19 comprising at least one cam follower roller 19a configured for the movement (rotation) of the other claw 5b of the gripper 5 and movable along a corresponding track 19c with cam profiles;
a third kinematic unit 20 comprising a pair of cam follower rollers 20a configured for a radial movement of the gripper 5 relative to the axis of rotation X3 of the transfer wheel 3 and movable along corresponding tracks 20c with cam profiles;
a fourth kinematic unit 21 configured to allow a tensioning of at least of the second kinematic unit 19 and comprising a movable cam follower roller 21a in a track with cam profiles (not illustrated) having a path opposite to the cam profiles of the second kinematic unit 19.

The first three kinematic units 19, 20 and 21 are connected to the claws 5a and 5b through a connecting rod system 22 which is able to also obtain a hybrid roto-translation movement of the claws 5a and 5b during the angular movement of the gripper 5 along its circular path.

As illustrated in FIGS. 7 and 8, the second kinematic unit 19 comprises a further cam follower roller 19b positioned along the axis of rotation of the first roller 19a and at a different height.

This further cam follower roller 19b, in the presence of a correct filter bag 1 on the gripper 5, slides along a cam track section (not illustrated) similar to the track followed by the first cam follower roller 19a.

In the presence of a defective filter bag 1D picked up by the gripper 5, the sensor 7 sends a signal to the processing unit 17 which activates the second control means 9 comprising:
a control device 23 kinematically connected to
a sector 24 of auxiliary cam track which can be inclined or rotated and configured to intercept the further cam follower roller 19b of the second kinematic unit 19 in such a way as to disable the movement imparted by the first cam follower roller 19a and to block the opening movement of the claw 5b of the gripper 5 at least for an angular locking stretch TAB starting from the second angular position.

The sector 24 of auxiliary cam track has a limited extension and deactivates the first roller 19a for an angular stretch of path of a few degrees, and then again frees the first cam follower roller 19a and allowing the gripper 5 to return to a regular operation.

Substantially, the positions of the gripper 5 along the circumference of the transfer wheel 3 can be summarised in this way, see FIG. 1.

Positions of the gripper 5 with correct filter bag 1:
from the picking up position (first angular position) to the release position (second angular position), that is to say, angular stretch TA, gripper 5 in position for retaining the filter bag 1;
from the second angular position (unloading filter bag 1) to a third angular position, the gripper 5 is in an open position for releasing filter bag 1 (angular stretch TA1) with passage through the collecting device 4;
from the third angular position reached and up to a fourth angular position (close to the rejection area 8) the gripper 5 returns to a closed retaining position (stretch TA2), but could also remain in an open position;
close to the rejection area 8, that is, at the end of the angular stretch TA2 (at the fourth angular position), the gripper 5 performs an opening movement of the claws for an angular stretch TA3 which ends again at the first angular position for picking up a new filter bag 1.

Positions of the gripper 1 with defective filter bag 1D:
from the picking up position (first angular position) to the release position (second angular position), that is to say, angular stretch TA, gripper 5 in position for retaining the defective filter bag 1D;
activating the control means 9 for locking the opening of gripper 5 from the second angular position (locking defective filter bag 1D on the gripper 5) for a angular locking stretch TAB which ends after the angular stretch TA1, in such a way as to completely lock the opening of the gripper 5 also during the passage through the collecting device 4;
reactivating the path of the gripper 5 from the end of the angular locked position reached up to a fourth angular position (close to the rejection area 8) the gripper 5 remains in a closed retaining position (part of stretch TA2);

close to the rejection area 8, that is, at the end of the angular stretch TA2 (at the fourth angular position), the gripper 5 performs an opening movement of the claws 5a, 5b with release in the rejection area 8 of the defective filter bag 1D and then continue for an angular stretch TA3 which ends again at the first angular position for picking up a new filter bag.

As illustrated in FIGS. 4 and 5 and mentioned above, the two opposite vertical walls 11 and 12 and the base 13 of the collecting device 4 define a C-shaped channel.

The collecting device 4 is configured and sized to be passed through by the gripping elements 5 when they pass along the above-mentioned second angular position.

In light of this, the collecting device 4 comprises a head end having a front opening 4a configured for the front entrance of the filter bags 1 carried by the gripping element 5, and the bottom opening 4b configured for the outfeed downwards of the gripping element 5 which can be in a release position or locked in the second retaining position in the presence of a defective filter bag 1D.

It should be noted that the two opposite vertical walls 11 and 12 each have a tab 14, projecting towards the bottom opening 4b. The tab 14 has an inclined profile and is configured to intercept and temporarily fold the outer edges or sides of the filter bag 1 entering the device 4 (in such a way as to define an inlet with retaining of the filter bag 1 entered the channel C) (see FIG. 5).

Moreover, the collecting device 4 has the bottom opening 4b made on the bottom of the channel C.

The above-mentioned base 13 of the collecting device 4 is formed by a pair of flat elements spaced apart with the bottom opening 4b interposed between. Each of the flat elements extending from a respective one of the two vertical walls 11 and 12 with an L-shaped configuration specular to each other.

In light of this, the base 13 comprises a separating tooth 15 protruding horizontally in the bottom opening 4b and configured for folding a defective filter bag 1D whilst it is directed towards the rejection area 8, in such a way as to avoid a contact between a defective filter bag 1D and a filter bag 1 previously rested on the base 13.

As illustrated in FIG. 6, the rejection area 8 of the defective filter bags 1D comprises a body 16 for guiding, conveying and releasing the defective filter bag 1D positioned close to the transfer wheel 3.

The body 16 has a first curved surface 16a with a profile substantially parallel to the trajectory of the gripping element 3 and matching the trajectory of the gripping element 5 along a limited angular stretch.

The guide body 16 also comprises at least one vertical channel 16b configured for the free passage of the gripping element 5, that is to say, of the claws 5a and 5b, and separating the gripping element 5 and the defective filter bag 1D.

In light of this, the guide body 16 comprises two vertical channels 16b which allow the free passage of the gripping element 5 and the simultaneous separation of the defective filter bag 1D from the gripping element 5.

The guide body 16 also comprises a second surface 16c opposite the first curved surface 16a configured for guiding the separation and the guided falling of the defective filter bags 1D, when present.

The defective 1D filter bag released will then be collected inside a suitable container, not illustrated.

This invention also provides a method for grouping together the filter bags 1 for infusion products.

The method comprises the following steps:

actuating a transfer wheel 3 in a synchronised fashion with a movement wheel 2, and where the transfer wheel 3 is equipped with a plurality of gripping elements 5 positioned along a circumference;

picking up, in a first angular position, a filter bag 1 from the movement wheel 2 by means of a gripping element 5 of the plurality of gripping elements 5;

releasing the filter bag 1 picked up by the gripping element 5 in a collecting device 4 positioned close to the transfer wheel 3, in a second angular position and after an angular stretch TA of rotation has been travelled along a feed direction A;

detecting by sensor means 7 a possible defect of the filter bags 1, in such a way as to identify defective filter bags 1D before they reach the second angular position where the collecting device 4 is located;

actuating control means 9 for preventing the gripping element 5 from releasing the filter bag 1D in the second angular position, that is, in the collecting device 4, when the filter bag 1D being gripped has been detected to be defective by the sensor means 7;

releasing the defective filter bags 1D in a rejection area 8 located in a position lower than the collecting device 4, and where the rejection area 8 is located downstream of the collecting device 4 and upstream of the first angular position, relative to the feed direction A; and wherein the gripping element 5, when it passes along the second angular position, passes through a bottom opening 4b of the collecting device 4 located close to the transfer wheel 3.

Moreover, each time the filter bag 1 is released in the collecting device 4, the gripping element 5 pushes a further filter bag already located in the collecting device 4 along an accumulation direction to make space for the filter bag from released each time.

The preset aims are fully achieved with the machine structure just described.

In effect, a machine according to the invention is extremely flexible, configurable as a function of the filter bag to be made, and with a high productivity.

The transfer wheel structured in this way is extremely precise and has a high operational flexibility irrespective of the number of carousels present in the machine or of the position in which it is applied in the machine.

The presence of the sensor means and of the combination between first and second control means define a precise and rapid system for selecting and eliminating defective filter bags even at high operating speeds.

The invention claimed is:

1. A machine for grouping together filter bags for infusion products, comprising:
   a movement wheel which can be rotated about a first axis of rotation;
   a transfer wheel which can be operated, in a synchronised fashion with the movement wheel, in rotation about a second axis of rotation, parallel to the first axis of rotation;
   a collecting device for collecting filter bags configured for receiving filter bags and positioned close to said transfer wheel;
   a plurality of gripping elements positioned along the circumference of the transfer wheel and movable with it between a picking up configuration for picking up, in a first angular position, a filter bag from the movement wheel and a release configuration for releasing the filter bag in the collecting device, in a second angular position and after an angular stretch of rotation has been travelled along a feed direction, sensor means configured for detecting a possible defect of the filter bags, in such a way as to identify defective filter bags before they reach said second angular position where the collecting device is located;

a rejection area configured for receiving the defective filter bags, said rejection area being located in a position lower than the collecting device;

characterised in that the rejection area is located downstream of the collecting device and upstream of the first angular position, relative to the feed direction, in that said machine also comprises locking control means configured to control the gripping element in such a way as to prevent the release of the filter bag in the second angular position, that is to say, in the collecting device, when the filter bag being gripped has been detected to be defective by the sensor means, and in that said collecting device is equipped with a bottom opening located close to the transfer wheel and sized to be passed through by the gripping elements when they pass along the second angular position.

2. The machine according to claim 1, wherein the collecting device comprises two opposite vertical walls positioned at a distance such as to touch opposite sides of a filter bag and a base configured to support from below a bottom of a filter bag, said base being equipped with said bottom opening.

3. The machine according to claim 2, wherein said two opposite vertical walls are each equipped with a tab, projecting towards said bottom opening, said tab having an inclined profile and being configured to intercept and temporarily fold sides of the filter bag entering said collecting device.

4. The machine according to claim 2, wherein the base of the collecting device is formed by a pair of flat elements spaced from each other with said base opening interposed between them, each flat element extending from one of said two vertical walls with an L-shaped configuration specular to each other.

5. The machine according to claim 2, wherein said base comprises a separating tooth protruding horizontally in the bottom opening and configured for folding a defective filter bag whilst it is directed towards said rejection area, in such a way as to prevent a contact between a defective filter bag and a filter bag previously rested on the base.

6. The machine according to claim 2, wherein said base of the collecting device is positioned horizontally and substantially perpendicular to a spoke of the transfer wheel.

7. The machine according to claim 1, wherein the angular stretch of rotation travelled along the feed direction by each gripping element between the first angular position and the second angular position is less than 180°.

8. The machine according to claim 1, wherein the rejection area of the defective filter bags comprises a body for guiding and conveying the defective filter bag positioned close to the transfer wheel and comprising at least one channel configured to allow the free passage of the gripping element and the separation of the defective filter bag from the gripping element.

9. The machine according to claim 8, wherein said body for guiding and conveying the defective filter bag comprises a first curved surface with a profile substantially parallel to the trajectory of the gripping element; and a second surface, opposite the first curved surface, configured for guiding the defective filter bag which has been released.

10. The machine according to claim 8, wherein the guide body comprises two vertical channels which allow the free passage of the gripping element and the simultaneous separation of the defective filter bag from the gripping element.

11. The machine according to claim 1, wherein the sensor means comprise at least one sensor configured to detect a defect in the filter bag picked up by the gripping element, and a processing unit connected to the sensor for receiving from the latter a signal that a defective filter bag has been picked up by the gripping element, and to the locking control means to send them a locking activation signal, so as to prevent the gripping unit from releasing the defective filter bag in the second angular position.

12. The machine according to claim 1, wherein said gripping element is also configured and can be operated in such a way that when releasing the filter bag in the collecting device, the gripping element pushes a further filter bag already positioned in the collecting device along an accumulation direction to make space for the filter bag released each time.

13. The machine according to claim 1, wherein each gripping element comprises a gripper comprising two claws for retaining the filter bag and articulated on the transfer wheel; each gripper being connected to gripper control means configured to rotate the two claws between a gripping or releasing position wherein the two claws are mutually spaced apart, and a retaining position of the filter bag, wherein the two claws are mutually close together with the filter bag interposed, for retaining the filter bag over time at least along the angular stretch of rotation between said first and second angular positions.

14. The machine according to claim 13, wherein one of said two claws is configured for pushing the further filter bag located in the collecting device along the accumulation direction.

15. The machine according to claim 13, wherein the means for controlling the gripper comprise at least a first kinematic unit comprising cam follower rollers configured for moving one of the two claws of the gripper and movable along corresponding tracks with cam profiles to allow said gripping or releasing position and said retaining position.

16. The machine according to claim 15, wherein the gripper control means also comprise a second kinematic unit comprising a further cam follower roller and wherein the locking control means comprise a control device, which can be activated in the presence of a defective filter bag, kinematically connected to an auxiliary sector of rotatable cam track and configured to intercept the further cam follower roller of the second kinematic unit in such a way as to lock the opening movement of the two claws of the gripper for at least one angular locking stretch.

17. The machine according to claim 1, wherein said movement wheel is located lower than the transfer wheel.

18. A method for grouping together filter bags for infusion products comprising the steps of:

actuating a transfer wheel in a synchronised fashion with a movement wheel, said transfer wheel being equipped with a plurality of gripping elements positioned along a circumference;

picking up, in a first angular position, a filter bag from the movement wheel using a gripping element of said plurality of gripping elements;

releasing the filter bag picked up by the gripping element in a collecting device positioned close to said transfer wheel, in a second angular position and after a angular stretch of rotation has been travelled along a feed direction;

detecting by sensor means a possible defect of the filter bags, in such a way as to identify defective filter bags before they reach said second angular position where the collecting device is located;

actuating locking control means for preventing the gripping element from releasing the filter bag in the second angular position, that is, in the collecting device, when the gripping filter bag has been detected to be defective by the sensor means;

releasing the defective filter bags in a rejection area located at a position lower than the collecting device, said rejection area being located downstream of the collecting device and upstream of the first angular position, relative to the feed direction;

wherein said gripping element, when it passes along said second angular position, passes through a bottom opening of the collecting device located close to the transfer wheel.

19. The method according to claim 18, wherein each time the filter bag is released into the collecting device, said gripping element pushes a further filter bag already located in the collecting device along an accumulation direction to make space for the filter bag released each time.

\* \* \* \* \*